-

US011733124B2

(12) United States Patent
Chopko

(10) Patent No.: US 11,733,124 B2
(45) Date of Patent: Aug. 22, 2023

(54) PRESSURE CONTROLLED CARGO CONTAINER FOR CONTROLLED ATMOSPHERE APPLICATIONS

(71) Applicant: Carrier Corporation, Palm Beach Gardens, FL (US)

(72) Inventor: Robert A. Chopko, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 368 days.

(21) Appl. No.: 17/046,609

(22) PCT Filed: Apr. 10, 2019

(86) PCT No.: PCT/US2019/026738
§ 371 (c)(1),
(2) Date: Oct. 9, 2020

(87) PCT Pub. No.: WO2019/199932
PCT Pub. Date: Oct. 17, 2019

(65) Prior Publication Data
US 2021/0108984 A1  Apr. 15, 2021

Related U.S. Application Data

(60) Provisional application No. 62/656,129, filed on Apr. 11, 2018.

(51) Int. Cl.
*G01M 3/32* (2006.01)
*B65D 90/51* (2019.01)
*B65D 88/12* (2006.01)

(52) U.S. Cl.
CPC ......... *G01M 3/3272* (2013.01); *B65D 88/121* (2013.01); *B65D 90/51* (2019.02)

(58) Field of Classification Search
CPC .......... G01M 3/26; G01M 3/226; G01M 3/02; G01M 3/3209; G01M 3/3236; G01M 3/3263; G01M 3/3272; G01M 3/186
(Continued)

(56) References Cited

U.S. PATENT DOCUMENTS 4,911,317 A * 3/1990 Schloesser ........... B65D 90/046
53/469
5,438,841 A 8/1995 Cahill-O'Brien et al.
(Continued)

FOREIGN PATENT DOCUMENTS

CA 2122250 A1 3/1994
CN 1733568 A 2/2006
(Continued)

OTHER PUBLICATIONS

ESPACENET Machine Translation of CN 103017989 A Which Originally Published On Apr. 3, 2013. (Year: 2013).*
(Continued)

*Primary Examiner* — David A. Rogers
(74) *Attorney, Agent, or Firm* — Cantor Colburn LLP

(57) ABSTRACT

A container box, having: a container controller for controlling the container box, one or more pressure transducers disposed within the container box, the one or more pressure transduces operatively connected to the container box, wherein the container box is configured for monitoring pressure within the container box with the pressure transducers, the container box configured to perform an airtightness test, including: pressurizing the container box until pressure in the container box is above a first threshold; monitoring pressure in the container box to determine when pressure in the container box is proximate the first threshold; monitoring a first duration during which pressure in the contain box drops from the first threshold to a second
(Continued)

threshold; determining whether the first duration is within an acceptable range, and when the duration is outside the acceptable range, communicating an alert to a container box monitoring implement.

16 Claims, 2 Drawing Sheets

(58) Field of Classification Search
USPC .................................................. 73/40–49.8
See application file for complete search history.

(56) References Cited

U.S. PATENT DOCUMENTS

| | | | |
|---|---|---|---|
| 5,457,963 A | 10/1995 | Cahill-O'Brien et al. | |
| 5,460,013 A * | 10/1995 | Thomsen | F25D 3/125 62/239 |
| 5,548,992 A * | 8/1996 | Hallett | G01M 3/226 73/40 |
| 6,047,588 A * | 4/2000 | Danilychev | G01N 1/22 206/524.8 |
| 6,092,430 A * | 7/2000 | Liston | A23L 3/3418 426/418 |
| 6,460,352 B1 | 10/2002 | Lemcoff et al. | |
| 6,701,776 B2 * | 3/2004 | Stetter | G01M 3/226 73/49.2 |
| 6,722,187 B2 * | 4/2004 | Grieve | F02M 25/0809 73/114.38 |
| 6,923,111 B2 | 8/2005 | Kiefer et al. | |
| 6,996,997 B2 | 2/2006 | Wiff et al. | |
| 8,534,120 B1 * | 9/2013 | Pavlik | G01M 3/3218 73/49.2 |
| 8,610,588 B2 | 12/2013 | Asprovski et al. | |
| 9,097,456 B2 | 8/2015 | Thogersen et al. | |
| 9,121,634 B2 | 9/2015 | Rogers et al. | |
| 9,339,045 B2 | 5/2016 | Chadwick et al. | |
| 10,024,749 B2 * | 7/2018 | Spartz | G01M 3/02 |
| 10,796,553 B2 * | 10/2020 | Carson | G01M 3/226 |
| 11,549,742 B2 * | 1/2023 | Postgate | B60P 3/20 |
| 2004/0007050 A1 * | 1/2004 | Stetter | G01M 3/226 73/40.7 |
| 2007/0000310 A1 * | 1/2007 | Yamartino | G01M 3/226 73/40.7 |
| 2008/0066525 A1 * | 3/2008 | Kojima | G01M 3/363 73/45.4 |
| 2009/0165535 A1 * | 7/2009 | Adams | G01M 3/025 73/49.7 |
| 2012/0118003 A1 * | 5/2012 | Stone | B65D 88/74 29/890.035 |
| 2013/0113289 A1 * | 5/2013 | Ma | F25D 29/006 307/64 |
| 2013/0298592 A1 * | 11/2013 | Hill, Jr. | F24F 7/08 62/426 |
| 2015/0135737 A1 * | 5/2015 | Cresswell | F25D 11/003 62/190 |
| 2017/0003191 A1 | 1/2017 | Raymond-Krochmal et al. | |
| 2017/0112171 A1 | 4/2017 | Cermak et al. | |
| 2017/0127705 A1 | 5/2017 | Cermak et al. | |
| 2017/0356778 A1 | 12/2017 | Thogersen et al. | |

FOREIGN PATENT DOCUMENTS

| | | | |
|---|---|---|---|
| CN | 1880185 A | | 12/2006 |
| CN | 101045498 A | | 10/2007 |
| CN | 101280991 B | | 10/2008 |
| CN | 103017989 A | * | 4/2013 |
| CN | 103017989 A | | 4/2013 |
| CN | 104053613 B | | 7/2016 |
| CN | 107878949 A | | 4/2018 |
| WO | 9516194 A1 | | 6/1995 |
| WO | 9819146 A1 | | 5/1998 |
| WO | 2016108953 A1 | | 7/2016 |
| WO | 2016139364 A1 | | 9/2016 |
| WO | 2016174288 A1 | | 11/2016 |

OTHER PUBLICATIONS

ESPACENET Machine Translation of WO 2016/174288 A1 Which Originally Published On Nov. 3, 2016. (Year: 2016).*
IPRP; PCT/US2019/026738; dated Oct. 22, 2020; 8 pages.
International Search Report and Written Opinion; Application No. PCT/US2019/026738; dated Jul. 22, 2019; 13 pages.
Chinese Office Action; dated Oct. 10, 2022; Application No. 201980038874.7; Filed: Apr. 10, 2019; 9 pages.
European Office Action; dated May 25, 2022; Applicaiton No. 19719120.8; Filed: May 10, 2019; 4 pages.

* cited by examiner

PRESSURE CONTROLLED CARGO CONTAINER FOR CONTROLLED ATMOSPHERE APPLICATIONS

CROSS-REFERENCE TO RELATED APPLICATIONS

This application is a National Stage Application of International Application No. PCT/US2019/026738 filed Apr. 10, 2019, which claims the benefit of U.S. Provisional Application No. 62/656,129 filed Apr. 11, 2018, the disclosures of which are incorporated herein by reference in their entirety.

BACKGROUND

Exemplary embodiments pertain to the art of container transport and more specifically to a pressure controlled cargo container.

A cargo ship, sometimes referred to as a tanker, freighter ship or container ship, may carry many thousands of controlled atmosphere type cargo containers, alternatively referred to as container boxes. Typical container boxes are twenty (20) feet long and forty (40) feet long. Studies show that up to ninety (90) percent of non-bulk cargo (bulk cargo being unpackaged commodity cargo) worldwide is transported by container boxes.

Before shipment, a manual air tightness test may be conducted on each container box. An air tightness test may include pressurizing a typical container box to between two and a half and three inches of water-gauge (WG) and timing a duration in which the container box pressure drops from two inches WG to one inch WG. To pass the test, the pressure drop duration for a forty foot container box should be at least eight minutes while the pressure drop duration for a twenty foot container box should be at least four minutes. Leaks should be found and repaired before container boxes are loaded for shipment. Typical leaks are found in a rear curtain of the container box, as well as in various implements associated with securing an access panel to a front of the container box, including perimeter gaskets, outer gaskets and bolt holes and around washers. Manually testing each container box before shipment may be time intensive and strain demands of a workforce.

BRIEF DESCRIPTION

A container box, comprising: a container controller for controlling the container box, one or more pressure transducers disposed within the container box, the one or more pressure transduces operatively connected to the container box, wherein the container box is configured for monitoring pressure within the container box with the pressure transducers, the container box configured to perform an airtightness test, including: pressurizing the container box until pressure in the container box is above a first threshold; monitoring pressure in the container box to determine when pressure in the container box is proximate the first threshold; monitoring a first duration during which pressure in the contain box drops from the first threshold to a second threshold; determining whether the first duration is within an acceptable range, and when the duration is outside the acceptable range, communicating an alert to a container box monitoring implement.

In addition to one or more of the above disclosed features, or as an alternate, the cargo container monitors for a trigger event to initiate the airtightness test, wherein the trigger event is one or more of: an elapsed of a predetermined period of time; a predetermined activity in a transportation cycle, including being loaded onto or unloaded from a transportation vehicle, arriving at or departing from a loading or unloading destination, arriving at one or more predetermined geographic locations; and manual initiation of a leakage test.

In addition to one or more of the above disclosed features, or as an alternate, wherein the transportation vehicle is one or more of a roadway based vehicle, a railway based vehicle and a waterway based vehicle.

In addition to one or more of the above disclosed features, or as an alternate, the container box includes a compressor and a compressor controller for controlling the compressor, the container controller being in operational communication with the compressor controller, wherein pressurizing the container box includes the container controller controlling the compressor to pressurizing container box until pressure in the container box is above the first threshold.

In addition to one or more of the above disclosed features, or as an alternate, the container box is a cargo container, the first threshold is two inches water-gauge and the second threshold is one inch-water gauge.

In addition to one or more of the above disclosed features, or as an alternate, the container box is a forty foot cargo container and, the acceptable duration range is greater than eight minutes.

In addition to one or more of the above disclosed features, or as an alternate, the container box is a twenty foot cargo container and, the acceptable duration range is greater than four minutes.

In addition to one or more of the above disclosed features, or as an alternate, the container box monitoring implement is a smart mobile device.

In addition to one or more of the above disclosed features, or as an alternate, the cargo container includes a front end and a rear end, the rear end including a rear curtain for enclosing cargo within the cargo container.

In addition to one or more of the above disclosed features, or as an alternate, the cargo container includes a front end and a rear end, the front end including an access panel housing therein the container controller, the access panel being connected to the front of the cargo container by a plurality of bolts and the access panel being fluidly secured to the cargo container by a plurality of gaskets.

A method for performing an airtightness test on a container box, wherein the method includes one or more of the above disclosed features and/or steps.

BRIEF DESCRIPTION OF THE DRAWINGS

The following descriptions should not be considered limiting in any way. With reference to the accompanying drawings, like elements are numbered alike.

DESCRIPTION

A detailed description of one or more embodiments of the disclosed apparatus and method are presented herein by way of exemplification and not limitation with reference to the Figures.

Figure 1:
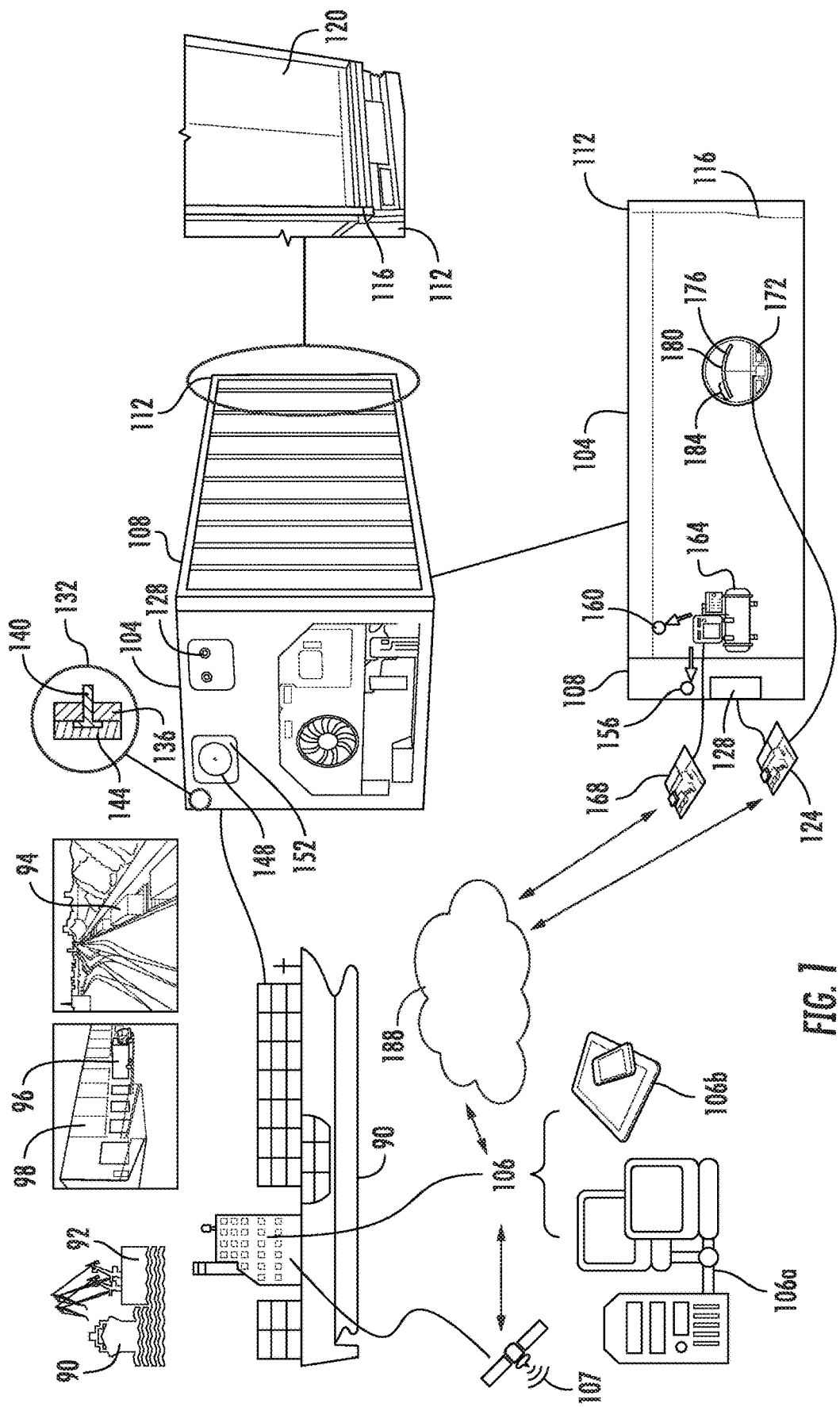
FIG. 1 illustrates an ecosystem for practicing the disclosed embodiments.

Turning to FIG. 1, a tanker 90, docking at and departing from a seaport 92, may transport a plurality of container boxes including a first container box 104. As each container box may be identical, the first container box 104 will be alternatively referred to herein as container box 104. Before and/or after shipment, the container box 104 may be subject to transportation on one or more of a container train 94, a truck 96, and may be loaded and/or unloaded at a storage warehouse 98. All aspects of the disclosed embodiments as discussed hereinafter are equally applicable to each of these forms of transportation and storage.

Aboard the tanker 90 there may be a logistics monitor 106 which may be an electronic monitoring implement providing monitoring functionality to the tanker 90 as disclosed herein. The logistic monitor 106 may be a stationary computing device 106a such as a visual panel or a portable computing device 106b such as a smart mobile device. Smart mobile devices may include mobile phones and/or tablets, executing an appropriate "app" available via an application store such as through Google (https://play.google.com/store/), Microsoft (https://www.microsoft.com/en-us/store/) or Apple. The logistics monitor 106 may be configured to communicate with a global positioning system (GPS) 107 or other global navigation satellite system (GNSS) for tracking a location of the tanker 90.

The container box 104 may have a front end 108 and a rear end 112. The rear end 112 may have a rear curtain 116 to seal cargo 120 therein. The front end 108 may have a container controller 124 disposed within an access panel 128. The container controller 124 may be used for controlling functionality of implements within the container box 104 as disclosed herein. The container controller 124 may be a Carrier MicroLink Controller by Carrier Corporation, a brand of UTC (United Technologies Corporation) Climate, Controls and Security division, headquartered in Farmington, Conn., USA.

The access panel 128 may have connector implements 132 for connecting the access panel to the container box 104. The connector implements 132 may include bolt holes 136, bolts 140 and washers 144. Surrounding the access panel 128 may be a perimeter gasket 148 and an outer gasket 152. Many of these implements as well as the area of the container box 104 around rear curtain 116 may provide an undesirable level of air leakage from the container box 104.

Within the container box 104 there may be one or more pressure transducers, including a first transducer 156 and a second transducer 160, in operational communication with the container controller 124. As each transducer may be identical and may be used identically, the first transducer may be alternatively referred to herein as transducer 156.

The one or more pressure transducers may enable the container controller 124 to determine a pressure within the container box 102. For example the container controller 124 may be equipped with a pressure gauge 172 such as a Magnehelic gauge by Dwyer Instruments, of Michigan City, Ind., USA. The gauge 172, in operational communication with the transducer 156, may be able to indicate pressure within the container box 104 as being in a plurality of pressure ranges. A first range 176 of the plurality of pressure ranges may have a first upper range of three inches Water-Gauge (WG) and a first lower range of two inches WG. For purposes of this disclosure the first lower range may be referred to as a first threshold. A second range 180 of the plurality of pressure ranges may have a second upper limit that may be the same as the first threshold, and a second lower limit of one inch WG. For purposes of this disclosure the second lower limit may be referred to as a second threshold. A third range 184 of the plurality of pressure ranges may have a third upper limit that may be the same as the second threshold and a third lower threshold limit at zero WG, which is ambient pressure.

A compressor 164 which may be an air compressor may be provided in or proximate the container box 104. The compressor 164 may have a compressor controller 168 for controlling functionality of the compressor 164 as disclosed herein. The compressor 164 may be operationally connected to the container controller 124.

The logistics monitor 106, the container controller 124 and the air compressor 164 may be configured to communicate over a network 188 which may be an electronic telecommunications network. The network 188 may apply wireless telecommunication protocols such as protocols applicable for electronic short range communications (SRC). For example the network 188 may be a private area network (PAN), which includes Bluetooth Low Energy (BTLE). BTLE is a wireless technology standard designed and marketed by the Bluetooth Special Interest Group (SIG) for exchanging network access codes (credentials) over short distances using short-wavelength radio waves. PAN technologies also include Zigbee, a technology based on Section 802.15.4 from the Institute of Electrical and Electronics Engineers (IEEE). More specifically, Zigbee represents a suite of high-level communication protocols used to create personal area networks with small, low-power digital radios for low-power low-bandwidth needs, and is suited for small scale projects using wireless connections. Alternatively, the network 188 may apply local area network (LAN) protocols such as WiFi, which is a technology based on the Section 802.11 from the IEEE. Yet alternatively, the network 188 may apply 3G wireless mobile telecommunications protocols, which is based on a set of standards used for mobile devices and mobile telecommunications use services and networks that comply with the International Mobile Telecommunications-2000 (IMT-2000) specifications by the International Telecommunication Union. Of course, these are non-limiting examples of wireless telecommunication protocols.

Figure 2:
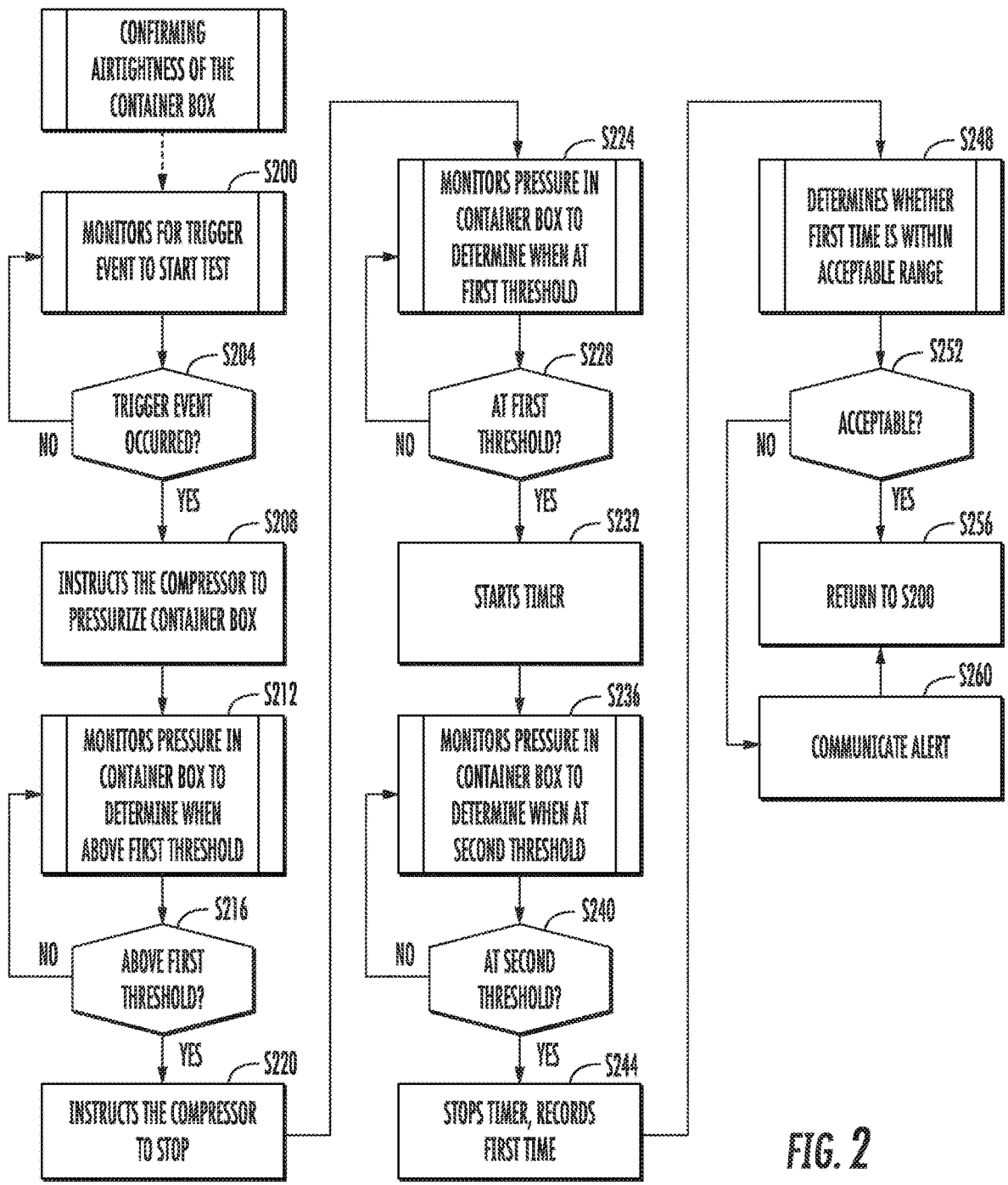
FIG. 2 illustrates a process for practicing a disclosed embodiments.

Turning to FIG. 2, illustrated is a process of confirming airtightness of the container box 104. At step S200 the container controller 124 may monitor for a trigger event to start an airtightness test. A trigger event may be, for example, the elapse of a predetermined period of time. Alternatively or in addition, a trigger event may occur at certain legs in a shipping transportation cycle, such as being loaded onto or unloaded from the cargo truck 96 or cargo train 94 at an initial or final destination warehouse 98, arriving at or departing from the seaport 92, and/or begin loaded onto or unloaded from the tanker 90.

In addition or alternatively a trigger event may be the arrival at one or more predetermined geographic locations while traveling, identified using GPS 107. For example, communicating with the logistics monitor 106 for the tanker 90, the container controller 124 may be able to obtain geographic location data from GPS 107 functionality on the logistics monitor 106 to identify geographic points serving as trigger events. In addition or alternatively a trigger event may be a manual initiation of an airtight test at any time. So long as a trigger event has not occurred at step S204 the container controller may cycle back to step S200.

If a trigger event occurs then at step S204 the container controller 124 may advance to step S208 of instructing the compressor 164 to pressurize the container box 104. At step S212 the container controller 124 may monitor pressure readings in the container box 104 to determine when pressure is above the first threshold. The monitoring may be performed by the container controller 124 operationally communicating with the one or more pressure transducers during pressurization of the container box 104. So long as the pressure remains below the first threshold at step S216 the container controller 124 may cycle back to step S212.

When the pressure rises above the first threshold then at step S216 the container controller 124 may advance to step S220 to instructing the compressor 164 to stop. At step S224 the container controller 124 may monitor for when pressure in the container box 104 falls to about the first threshold. So long as the pressure in the container box 104 remains above the first threshold, at step S228 the container controller 124 may cycle back to step S224.

When the pressure in the container box drops to about the first threshold, then at step S228 the container controller 124 may advance to step S232 of starting a timer. At step S236 the container controller 124 may monitor for when pressure in the container box 104 falls to about the second threshold. So long as the pressure in the container box 104 remains above the second threshold, at step S240 the container controller 124 may cycle back to step S236.

When the pressure in the container box drops to about the second threshold, then at step S240 the container controller may advance to step S244 of stopping the timer and recording a first duration representing the recorded time. At step S248 the container controller 124 may determine whether the first duration is within an acceptable range. That is, if the container box 104 is a forty foot container box, then an acceptable range may be greater than eight minutes. If the container box 104 is a twenty foot container box, then an acceptable range may be greater than four minutes. If the first duration is within an acceptable range then at step S256 the container controller 124 may cycle back to step S200.

If the first duration is outside of an acceptable range then at step S260 the container controller may communicate an alert and then may advance to step S200. The alert may be instructing the tanker logistics monitor 106 to issue a sound or visual alert indicating that the container box 102 has failed the air tightness test. Thereafter by retuning to step S200 the container controller 124 may continue to perform airtightness tests on the remaining container boxes in the tanker 90 at subsequent trigger events.

As disclosed above, the container controller may have the capability to be equipped with one or more pressure transducers enabling the performance of a pressure test during a shipping operation, instead of before the next trip. According to embodiments the container box may be pressurized either manually with a pressure hose or automatically using a pressurized cylinder or compressor attached to the container box. Either method may create the two and a half to three (2.5-3.0) inches WG needed to start the airtightness test of the container box. Some of the identified leak areas may be at the rear curtain, the access panel gaskets and the access panel bolt holes. If the access panel has been removed and replaced during transit due to a service need on the container box, the original airtightness of the container box may have been compromised.

The container controller may be able to monitor multiple pressure transducers. This may provide the opportunity for in-transit air pressure testing to evaluate the chances of conducting a successful pre-load test of the container box before a next shipment. In addition, the container controller may be used to automatically conduct a pre-load test and record the results.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A container box configured for transporting cargo on a ship, truck or train, the container box, comprising:
   a front end, and a rear end, the rear end having a rear curtain to seal cargo therein, the front end having a container controller disposed within an access panel;
   the container controller controlling the container box, one or more pressure transducers disposed within the container box, the one or more pressure transducers are operatively connected to the container box, wherein the container box is configured for monitoring pressure within the container box with the pressure transducers,
   the container box configured to perform an airtightness test during a shipping operation, including:
      pressurizing the container box until pressure in the container box is above a first threshold;
      monitoring pressure in the container box to determine when pressure in the container box is proximate the first threshold;
      monitoring a first duration during which pressure in the contain box drops from the first threshold to a second threshold;
      determining whether the first duration is within an acceptable range, and when the duration is outside the acceptable range, communicating an alert to a container box monitoring implement,
   wherein the cargo container controller monitors for a trigger event to automatically initiate the airtightness test, wherein the trigger event is a predetermined activity in a transportation cycle, including being loaded onto or unloaded from a transportation vehicle, arriving at or departing from a loading or unloading destination, arriving at one or more predetermined geographic locations.

2. The container box of claim 1 wherein the transportation vehicle is one or more of a roadway based vehicle, a railway based vehicle and a waterway based vehicle.

3. The container box of claim 1 including a compressor and a compressor controller for controlling the compressor, the container controller being in operational communication with the compressor controller, wherein pressurizing the container box includes the container controller controlling the compressor to pressurizing container box until pressure in the container box is above the first threshold.

4. The container box of claim 1 wherein the first threshold is two inches water-gauge and the second threshold is one inch-water gauge.

5. The container box of claim 4 wherein the container box is a forty foot cargo container and, the acceptable duration range is greater than eight minutes.

6. The container box of claim 4 wherein the container box is a twenty foot cargo container and, the acceptable duration range is greater than four minutes.

7. The container box of claim 4 wherein the access panel is connected to the front of the cargo container by a plurality of bolts and the access panel being fluidly secured to the cargo container by a plurality of gaskets.

8. A method for performing an airtightness test during a shipping operation on a container box configured for transporting cargo on a ship, truck or train, wherein the container box includes:
- a front end, and a rear end, the rear end having a rear curtain to seal cargo therein, the front end having a container controller disposed within an access panel; the container controller controlling the container box, and one or more pressure transducers disposed within the container box, the one or more pressure transducers are operatively connected to the container box, wherein the container box is configured for monitoring pressure within the container box with the pressure transducers, the method comprising:
    - during a shipping operation, pressurizing the container box until pressure in the container box is above a first threshold;
    - monitoring pressure in the container box to determine when pressure in the container box is proximate the first threshold;
    - monitoring a first duration during which pressure in the contain box drops from the first threshold to a second threshold;
    - determining whether the first duration is within an acceptable range, and
    - when the duration is outside the acceptable range, communicating an alert to a container box monitoring implement,
- wherein the cargo container controller monitors for a trigger event to automatically initiate the airtightness test, wherein the trigger event is a predetermined activity in a transportation cycle, including being loaded onto or unloaded from a transportation vehicle, arriving at or departing from a loading or unloading destination, arriving at one or more predetermined geographic locations.

9. The method of claim 8 wherein the transportation vehicle is one or more of a roadway based vehicle, a railway based vehicle and a waterway based vehicle.

10. The method of claim 8 including a compressor and a compressor controller for controlling the compressor, the container controller being in operational communication with the compressor controller, wherein pressurizing the container box includes the container controller controlling the compressor to pressurizing container box until pressure in the container box is above the first threshold.

11. The method of claim 8 wherein the first threshold is two inches water-gauge and the second threshold is one inch-water gauge.

12. The method of claim 11 wherein the container box is a forty foot cargo container and, the acceptable duration range is greater than eight minutes.

13. The method of claim 11 wherein the container box is a twenty foot cargo container and, the acceptable duration range is greater than four minutes.

14. The method of claim 11 wherein the access panel being is connected to the front of the cargo container by a plurality of bolts, and the access panel being fluidly secured to the cargo container by a plurality of gaskets.

15. The container box of claim 11, wherein the container box monitoring implement is a smart mobile device.

16. The method of claim 11, wherein the container box monitoring implement is a smart mobile device.

* * * * *